(12) United States Patent
Ishii

(10) Patent No.: US 8,375,314 B2
(45) Date of Patent: Feb. 12, 2013

(54) INFORMATION PROCESSING APPARATUS, INFORMATION PROCESSING METHOD, AND RECORDING MEDIUM

(75) Inventor: Yuuichi Ishii, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 586 days.

(21) Appl. No.: 12/202,643

(22) Filed: Sep. 2, 2008

(65) Prior Publication Data
US 2009/0077481 A1 Mar. 19, 2009

(30) Foreign Application Priority Data
Sep. 14, 2007 (JP) ................................. 2007-240093

(51) Int. Cl.
*G06F 3/048* (2006.01)

(52) U.S. Cl. ........ 715/764; 715/234; 715/273; 715/760; 715/806

(58) Field of Classification Search ................... 715/760, 715/234–243, 248, 276–277, 744–747, 762–764, 715/806, 807; 345/530, 531, 533, 547, 553, 345/557, 558; 711/111, 113, 118–136, 170–173
See application file for complete search history.

(56) References Cited

U.S. PATENT DOCUMENTS

| | | | | |
|---|---|---|---|---|
| 6,016,535 | A * | 1/2000 | Krantz et al. | 711/171 |
| 6,487,562 | B1 * | 11/2002 | Mason et al. | 1/1 |
| 7,032,179 | B2 * | 4/2006 | Mack et al. | 715/762 |
| 7,149,747 | B1 * | 12/2006 | Cheng et al. | 1/1 |
| 7,685,368 | B1 * | 3/2010 | Fickie et al. | 711/133 |
| 7,689,923 | B2 * | 3/2010 | Massasso et al. | 715/762 |
| 7,703,026 | B2 * | 4/2010 | Bechtold et al. | 715/762 |
| 2004/0119741 | A1 * | 6/2004 | Teng et al. | 345/760 |
| 2004/0190034 | A1 * | 9/2004 | Ozawa et al. | 358/1.13 |
| 2005/0024355 | A1 * | 2/2005 | Yagi | 345/204 |
| 2005/0044490 | A1 * | 2/2005 | Massasso et al. | 715/517 |
| 2005/0240732 | A1 * | 10/2005 | Crick et al. | 711/133 |
| 2006/0077423 | A1 * | 4/2006 | Mathieson et al. | 358/1.15 |
| 2006/0077941 | A1 * | 4/2006 | Alagappan et al. | 370/338 |
| 2006/0200753 | A1 * | 9/2006 | Bhatia et al. | 715/505 |
| 2006/0206518 | A1 * | 9/2006 | Bhatia | 707/104.1 |

(Continued)

FOREIGN PATENT DOCUMENTS
| | | |
|---|---|---|
| JP | 2002-196627 | 7/2002 |
| JP | 2006-508622 | 3/2006 |

(Continued)

OTHER PUBLICATIONS
U.S. Appl. No. 12/041,273, filed Mar. 3, 2008.

*Primary Examiner* — Weilun Lo
*Assistant Examiner* — Enrique Iturralde
(74) *Attorney, Agent, or Firm* — Oblon, Spivak, McClelland, Maier & Neustadt, L.L.P.

(57) ABSTRACT

A disclosed information processing method for use in an information apparatus including a display unit comprises a creating step of creating screen components based on screen definition data in which a screen to be displayed on the display unit is previously defined, a display controlling step of displaying the screen formed with the screen components created in the creating step, and a storing step of storing, upon transition from the screen displayed in the display controlling step, all or a part of the screen components of the screen displayed before the transition. The information processing apparatus includes at least one of a scanner function, a copier function, a facsimile machine function, and a printer function.

12 Claims, 6 Drawing Sheets

U.S. PATENT DOCUMENTS

| | | | |
|---|---|---|---|
| 2006/0206798 A1* | 9/2006 | Kohlmeier et al. | 715/500.1 |
| 2007/0061488 A1* | 3/2007 | Alagappan et al. | 709/246 |
| 2007/0136533 A1* | 6/2007 | Church et al. | 711/137 |
| 2007/0159663 A1* | 7/2007 | Tsujimoto | 358/448 |
| 2007/0244964 A1* | 10/2007 | Challenger et al. | 709/203 |
| 2008/0126831 A1* | 5/2008 | Downey et al. | 714/4 |
| 2008/0147981 A1* | 6/2008 | Crick et al. | 711/133 |
| 2008/0150952 A1* | 6/2008 | Koarai | 345/531 |
| 2008/0172444 A1 | 7/2008 | Ishii | |
| 2009/0172005 A1* | 7/2009 | LaToza et al. | 707/102 |

FOREIGN PATENT DOCUMENTS

| | | |
|---|---|---|
| WO | WO 2004/068367 A2 | 8/2004 |

\* cited by examiner

```
<root>
<screen id="TopScreen" isCache="true">
<StaticText id="application" label="E-XG APPlication" x="0" y="0" width="100" height="30" />
<Button id="title" label="Please select a project." x="120" y="0" width="300" height="30">
<action id="onClick">
<callback className="" methodName="" parameters="" />
</action>
</Button>
</screen>
</root>
```

FIG.6

```
<root>
<screen id="TopScreen" isCache="true" cacheMode="full or part">
<StaticText id="application" label="E-XG APPlication" x="0" y="0" width="100" height="30" />
<Button id="title" label="Please select a project." x="120" y="0" width="300" height="30">
<action id="onClick">
<callback className="" methodName="" parameters="" />
</action>
</Button>
</screen>
</root>
```

INFORMATION PROCESSING APPARATUS, INFORMATION PROCESSING METHOD, AND RECORDING MEDIUM

BACKGROUND OF THE INVENTION

1. Field of the Invention

The present invention relates to an information processing apparatus, an information processing method, and a recording medium.

2. Description of the Related Art

Conventionally, delivery systems are known that provide an input function for inputting various types of image data items from a scanner, a copier, a printer, a facsimile machine, a mail server, a file server, or the like and a function of outputting (delivering) data to the destination such as a mail sever, a printer, a file server, a document management server, or the like using a specified method.

One of such delivery systems is an MFP (Multifunction Peripheral), which displays a GUI for specifying the destination on its operations panel so that a user can directly specify the destination using the GUI.

Using XML (extensible Markup Language) for definitional description of the GUI to be displayed on the MFP has the following advantages.

One advantage is that, in the case where a new function is added to the destination, a screen for the new function, such as a setting screen of the new function, can additionally be displayed without modifying a program. Another advantage is that, if information of screen transition is described in a UI (User Interface) XML definition, in the case where a screen flow is changed, the screen design or the like can be updated without modifying a program.

Figure 1:
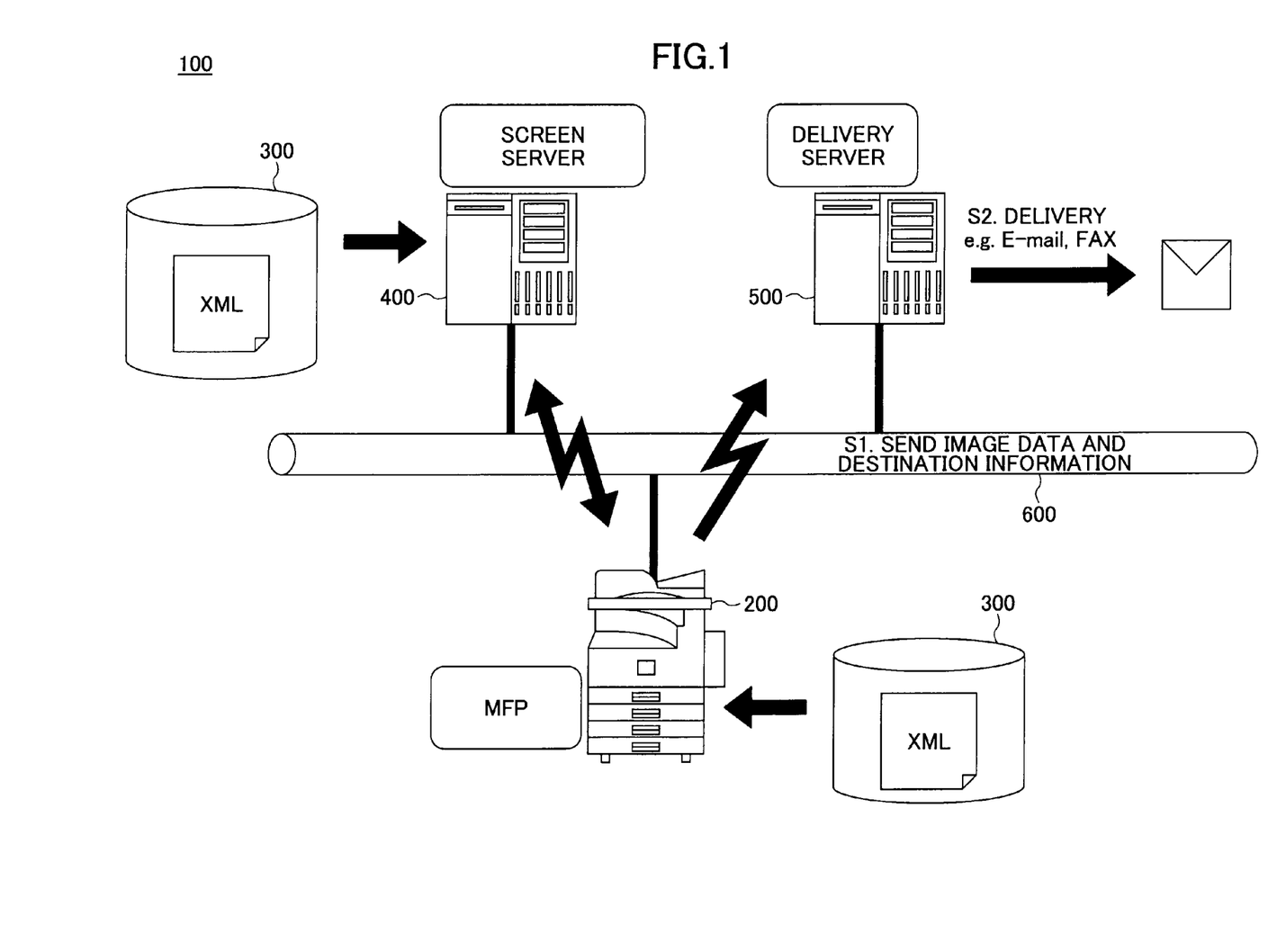
FIG. 1 is diagram illustrating a related-art delivery system.

FIG. 1 is diagram illustrating a related-art delivery system 100. In FIG. 1, an MFP (printer) 200, a screen server 400, and a delivery server 500 are connected via a network 600, thereby forming the delivery system 100.

A user specifies the information of the destination and scans a document using the MFP 200. The information of the destination is specified using a GUI of the MFP 200. The GUI is created based on XML data of a screen stored in a storage unit 300 inside the MFP 200. It is to be noted that the XML data of a screen may be stored in the MFP 200 or may be stored in the screen server 400 connected via the network 600.

The MFP 200 sends image data obtained by scanning the document and the information of the destination to the delivery server 500 (S1 in FIG. 1). The delivery server 500 resolves an output method and the destination based on the input information of the destination and executes delivery (S2 of FIG. 1). The image data delivered from the delivery server 500 to a computer (not shown) or the like are subjected to a receiving process by a program installed in the computer.

Japanese Laid-Open Patent No. 2002-196627 discloses a technique that facilitates recovery from an error having occurred during use of a digital copier in a normal image formation mode, thereby improving the usability.

International Publication No. WO2004/068367 (Published Japanese translation No. 2006-508622 discloses a technique related to a session-return enabling stateful Web applications.

A problem with related-art information processing apparatuses is that, in the case of a screen flow having a change of state between screens, if a screen is discarded every time, it is impossible to display the previous state when returning to the previous screen.

SUMMARY OF THE INVENTION

In view of the forgoing the present invention is directed toward providing an information processing apparatus, an information processing method, and a recording medium that are capable of displaying the previous state when returning to the previous screen even in the case of a screen flow having a change of state between screens.

In an embodiment of the present invention, there is provided an information processing apparatus including a display unit. The apparatus includes a creating unit configured to create screen components based on a screen definition data in which a screen to be displayed on the display unit is previously defined; a display control unit configured to display the screen formed with the screen components created by the creating unit; and a storing unit configured to store, upon transition from the screen displayed by the display controlling unit, all or a part of the screen components of the screen displayed before the transition. The information processing apparatus includes at least one of a scanner function, a copier function, a facsimile machine function, and a printer function.

In another embodiment of the present invention, there is provided an information processing method for use in an information apparatus including a display unit. The method includes a creating step of creating screen components based on screen definition data in which a screen to be displayed on the display unit is previously defined; a display controlling step of displaying the screen formed with the screen components created in the creating step; and a storing step of storing, upon transition from the screen displayed in the display controlling step, all or a part of the screen components of the screen displayed before the transition. The information processing apparatus includes at least one of a scanner function, a copier function, a facsimile machine function, and a printer function.

In still another embodiment of the present invention, there is provided a computer-readable recording medium storing a program. The program includes computer-executable instructions for executing the information processing method described above.

According to an aspect of the present invention, there are provided an information processing apparatus, an information processing method, and a recording medium that are capable of displaying the previous state when returning to the previous screen even in the case of a screen flow having a change of state between screens.

DETAILED DESCRIPTION OF THE PREFERRED EMBODIMENT

Exemplary embodiments of the present invention are described below with reference to the accompanying drawings. Although the present invention is applied to a common information processing apparatus such as a typical MFP having functions of scanner, copier, facsimile machine, printer and the like in the embodiments described below, the present invention is applicable to other apparatuses. For example, the present invention may be applied to a typical computer.

Embodiments (Functional Configuration)

Figure 2:
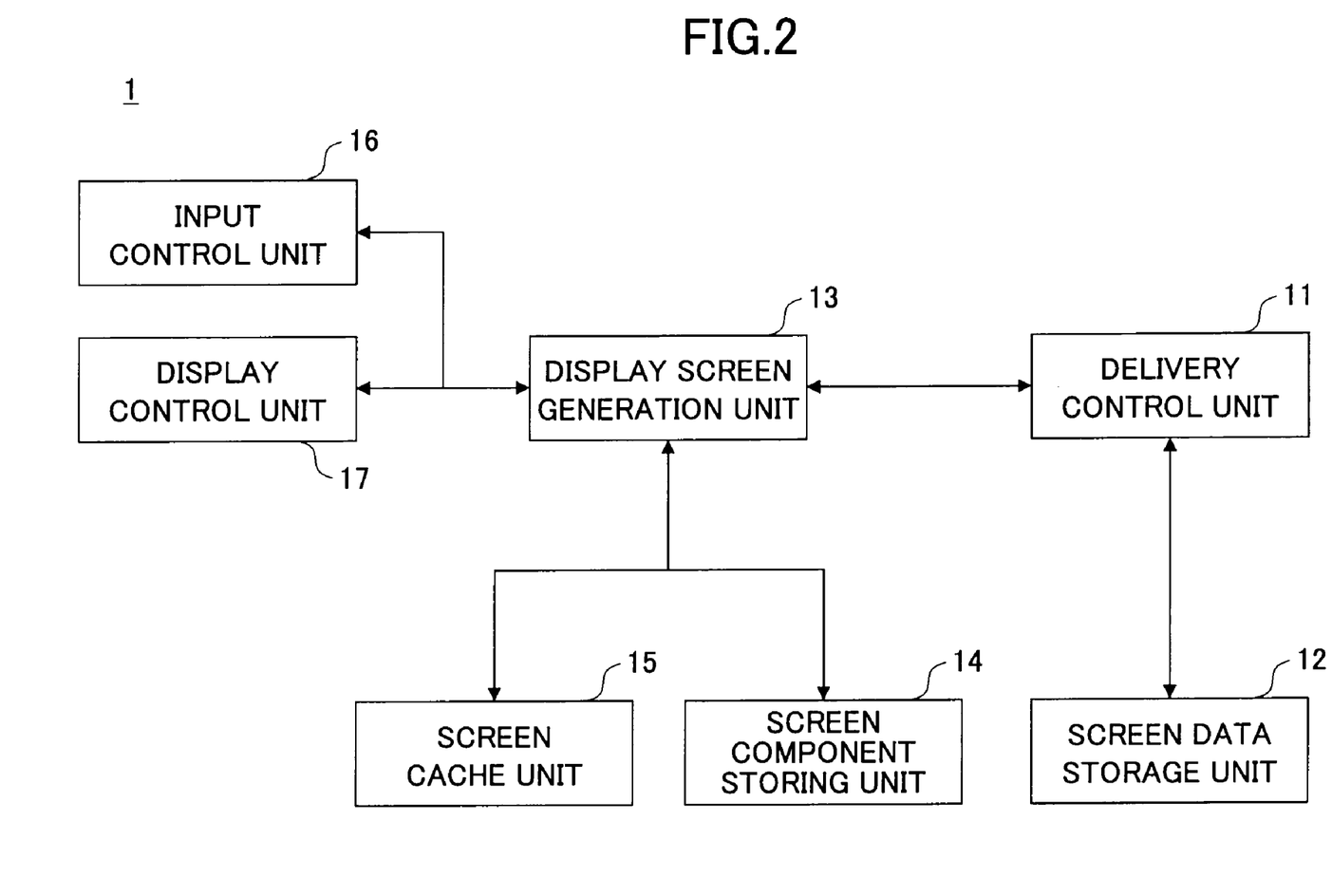
FIG. 2 is a functional block diagram of an information processing apparatus according to an embodiment.

FIG. 2 is a functional block diagram of an MFP 1 as an information processing apparatus according to an embodiment. In FIG. 2, the MFP includes a delivery control unit 11, a screen data storage unit 12, a display screen generation unit 13, a screen component storing unit 14, a screen cache unit 15, an input control unit 16, and a display control unit 17.

The delivery control unit 11 performs control related to delivery. The delivery control unit 11 controls, for example, an operation of starting a scanning device such as a scanner of the MFP 1 and inputting image data to be delivered, and an operation of displaying a screen that prompts a user to specify information of the destination. For example, delivery application software installed in basic software (OS (Operating System)) of the MFP 1 may perform the control related to delivery.

The screen data storage unit 12 is configured to store screen data and may include a hard disk device of the MFP 1. The screen data stored in the screen data storage unit 12 include data (screen definition data) in an XML format defining a screen to be displayed on a display device (display unit) such as an operations panel of the MFP 1. The layout of GUI components to be disposed on the screen to be displayed and actions to be called in response to a user input are defined using tags.

The display screen generation unit 13 generates a display screen. More specifically, the display screen generation unit 13 receives the screen data of the screen to be displayed, which are acquired from the screen data storage unit 12 by the delivery control unit 11, and a display instruction from the delivery control unit 11 and generates display screen data based on the received screen data and the display instruction. For example, a CPU (Central Processing Unit) may generate a screen according to a display screen generation program installed in the MFP 1.

Especially, in the case where the screen data are in an XML format, screen components (screen component data) are generated (created) as display screen data according to the definition in the screen data.

The screen component storing unit 14 provides a function of storing the screen components generated by the display screen generation unit 13. For example, the screen component storing unit 14 may include a RAM (Random Access Memory) of the MFP 1.

The screen cache unit 15 provides a function of storing a part of or the entire cache data of the display screen data generated by the display screen generation unit 13. For example, the screen cache unit 15 may include a cache memory in the CPU of the MFP 1.

The input control unit 16 performs control related to various input operations. For example, the input control unit 16 inputs various types of information items in an input device (input unit) such as the operations panel of the MFP 1.

The display control unit 17 performs control related to various display operations. For example, the display control unit 17 controls the screen display content to be displayed on the display device such as the operations panel of the MFP 1.

With this functional configuration, when the delivery control unit 11 is started, the MFP 1 of the present embodiment performs operations such as an operation of starting a scanning device (e.g., a scanner) and inputting image data to be delivered, and an operation of prompting a user to specify information of the destination. In this embodiment, upon performing the latter operation of displaying a screen, the MFP 1 temporarily stores state (the components) of the screen so that the same screen can be created when returning to the screen later. Thus, even in the case of a screen flow having a change of state between screens, it is possible to display the previous state when returning to the previous screen. A more detailed description is given in "Exemplary Operations" described below.

A program (an information processing program of an embodiment of the present invention) necessary for realizing the functions of FIG. 2 may be recorded in a storage medium such as a CD-ROM and be distributed.

(Exemplary Operations)

Figure 3:
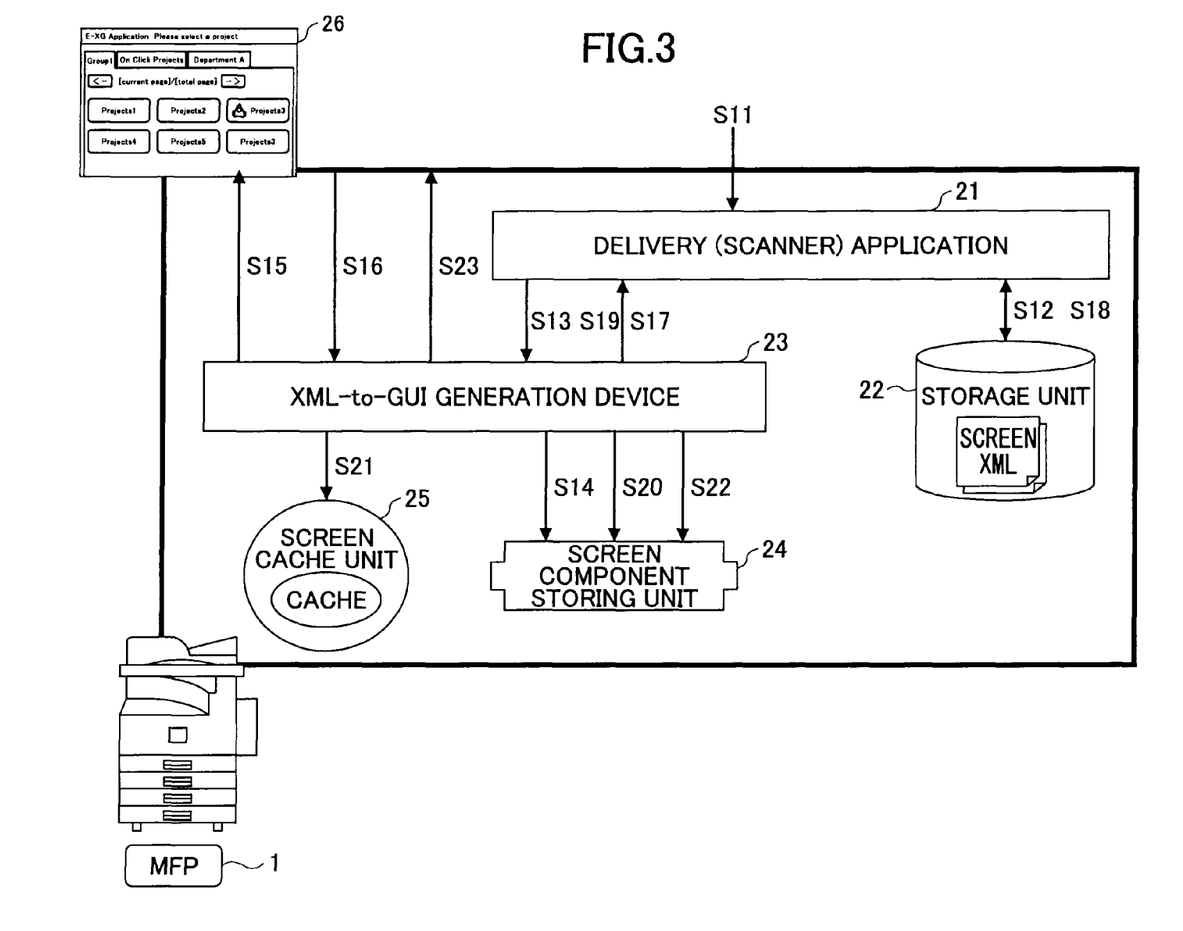
FIG. 3 is a diagram illustrating an overview of operations of an information processing apparatus according to an embodiment.

FIG. 3 is a diagram illustrating an overview of operations of the MFP 1 as an information processing apparatus according to the present embodiment. A delivery (scanner) application 21, a storage unit 22, an XML-to-GUI generation device 23, a screen component storing unit 24, and a screen cache unit 25 of FIG. 3 correspond to the delivery control unit 11, the screen data storage unit 12, the display screen generation unit 13, the screen component storing unit 14, and the screen cache unit 15, respectively, of FIG. 2. An operations control unit 26 corresponds to the input control unit 16 and the display control unit 17.

An example of operations of the MFP 1 (information processing apparatus) is described below. With these operations, upon displaying a screen, the MFP 1 temporarily stores the components of the screen so that the same screen can be created when returning to the screen later.

Figure 4:
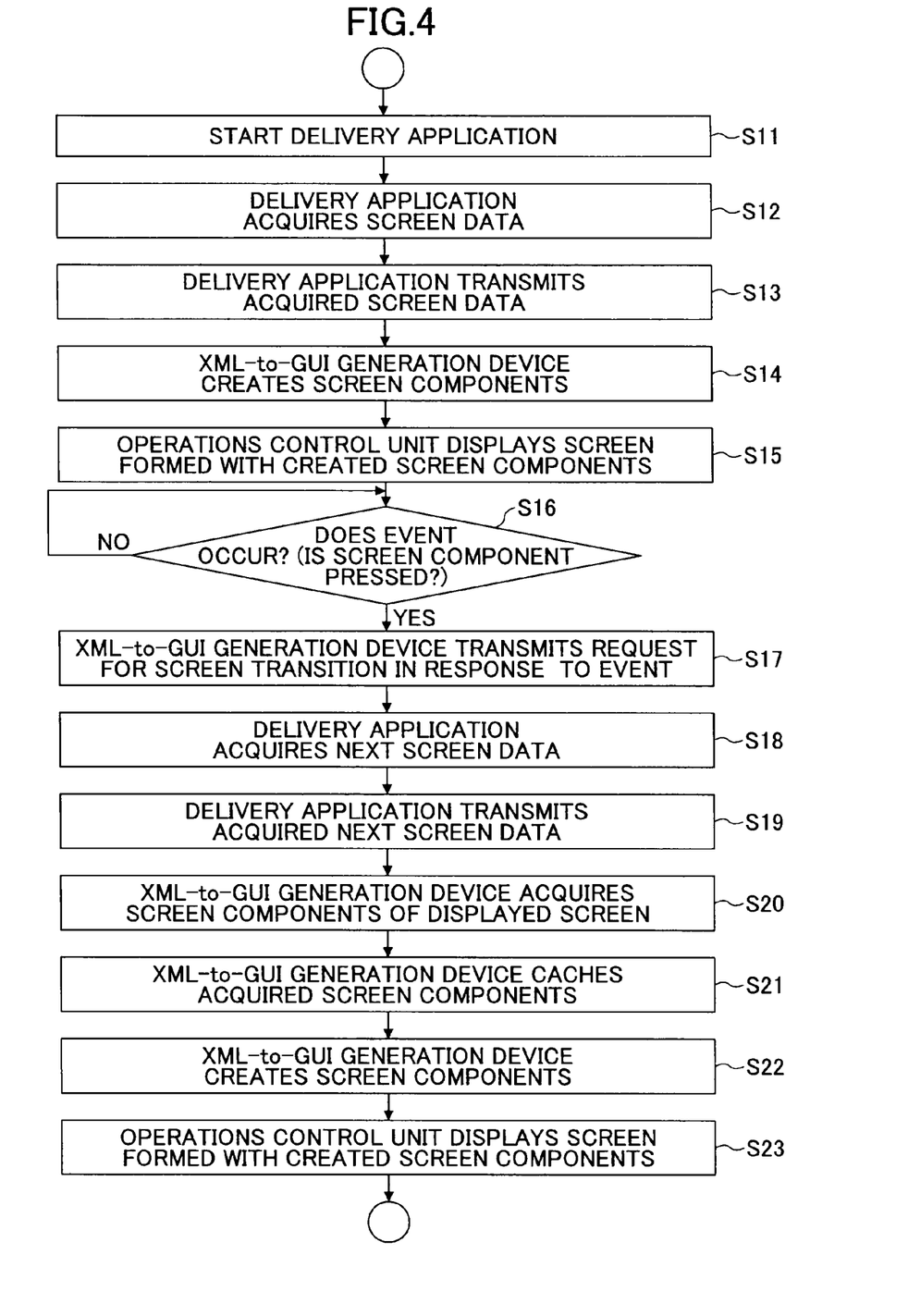
FIG. 4 is a flowchart illustrating operations of an information processing apparatus according to an embodiment.

FIG. 4 is a flowchart illustrating the operations shown in FIG. 3. That is, FIG. 4 is a flowchart illustrating the operations of the information processing apparatus according to the present embodiment.

First, the delivery application 21 is started (Step S11). In this example, the delivery application 21 is started by, for example, pressing a key of the MFP 1. Then in Step S12, the delivery application 21 acquires screen data stored in the storage unit 22. In this example, the delivery application 21 acquires, for example, XML data of a top screen from the storage unit 22 in order to display a GUI of an application of the MFP 1.

Then in Step S13 the delivery application 21 transmits the screen data acquired in Step S12 to the XML-to-GUI generation device 23.

Then in Step S14 the XML-to-GUI generation device 23 parses the screen data transmitted in Step S13 to create screen components. In this example, the XML-to-GUI generation device 23 parses the XML data transmitted in Step S13, i.e., performs an operation (parsing) of syntactically analyzing the XML data and determining the logical structure of the XML data. Thus the XML-to-GUI generation device 23 creates screen components (screen component data) based on the definition contained in the XML data. The created screen components are stored in the screen component storing unit 24.

Figure 5:
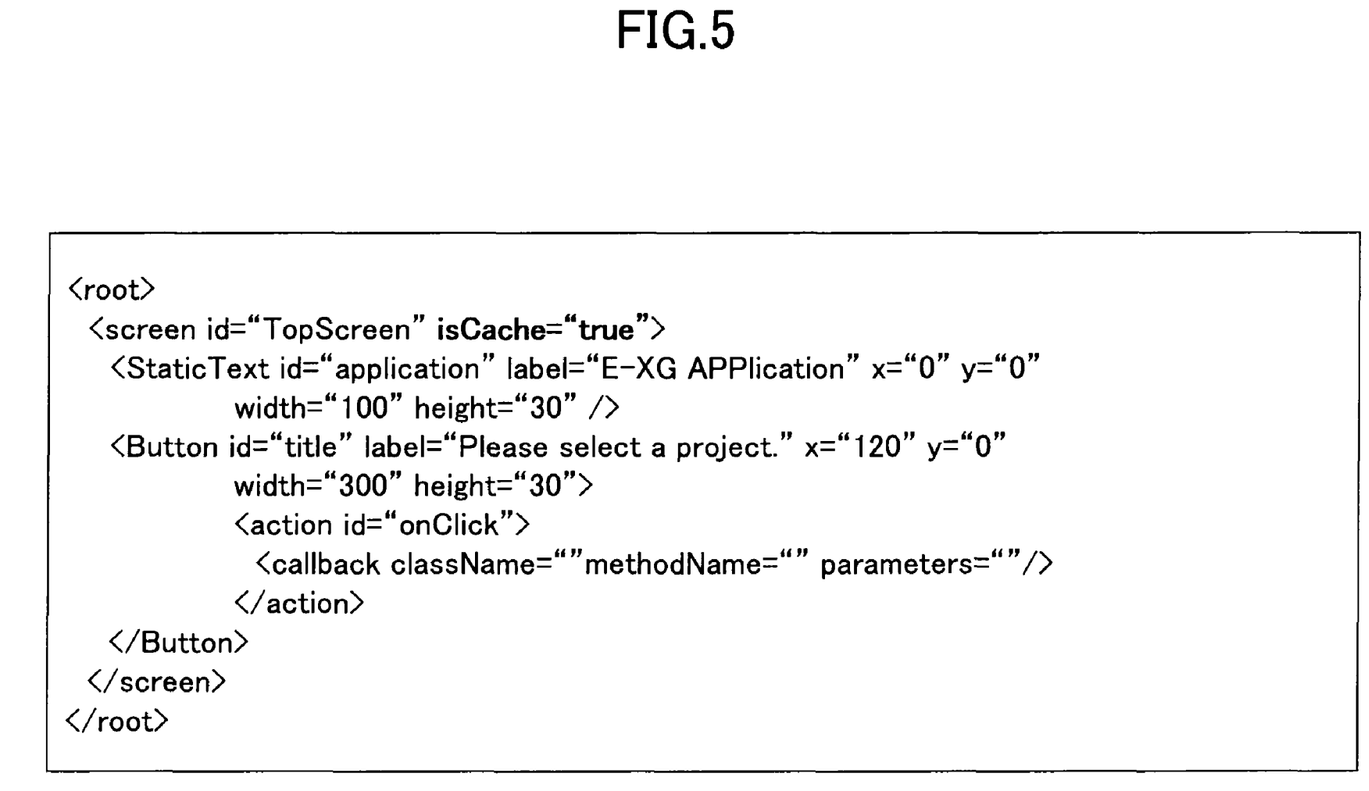
FIG. 5 is a diagram illustrating an example of screen data in an XML format.

The screen data to be processed in Step S14 include flag information (index information) indicating whether the screen data need to be cached, i.e., the screen data need to be stored. FIG. 5 shows an example of screen data in an XML format. In FIG. 5, characters in boldface (isCache="true") are flag information indicating whether the screen data need to be cached.

Then in Step S15 the XML-to-GUI generation device 23 causes the operations control unit 26 to display a screen formed with the screen components created in Step S14.

Then in Step S16 the operations control unit 26 waits for an event to occur, such as any button (screen component) being pressed by a user. If an event occurs (Yes in Step S16), i.e., if any screen component is pressed, the process proceeds to Step S17. If no event occurs (NO in S16), the process remains in Step S16 until an event occurs.

In Step S17 the XML-to-GUI generation device 23 receives the event from the operations control unit 26 and transmits a request for the next operation (screen transition in this example) to the delivery application 21.

Then in Step S18, in response to the request for the next operation transmitted in Step S17, the delivery application 21 recognizes the requested next operation is a screen transition and acquires the next screen data (screen data after the transition).

Then in Step S19 the delivery application 21 transmits the next screen data acquired in Step S18 to the XML-to-GUI generation device 23.

Then in Step S20 the XML-to-GUI generation device 23 acquires all the screen components of the screen displayed in Step S15 (i.e., the screen displayed before the transition) from the screen component storing unit 24. In this example, if in Step S14 it is recognized that the data of the screen to be displayed in Step S15 needs to be cached, in Step S20 all the screen components of the screen displayed in Step S15 are acquired. More specifically, because all the screen components can be acquired by acquiring the root window, the root window is acquired.

Then in Step S21 the XML-to-GUI generation device 23 clones (makes a copy of) the screen components acquired in Step S20 and transmits the cloned screen components to the screen cache unit 25, so that the cloned screen components are stored in the screen cache unit 25 (Step S21). A key that links the cache data of the screen components stored in the screen cache unit 25 to the screen components stored in the screen component storing unit 24 may be a screen ID uniquely assigned to each screen.

Then in Step S22 the XML-to-GUI generation device 23 parses the next screen data transmitted in Step S19 to create screen components of the next screen (Step S22). In this example, the screen components of the next screen are created in the same manner as in Step S14. The created screen components are stored in the screen component storing unit 24. Because the screen components of the previous screen are cached in Step S21, the screen is discarded.

Then in Step S23 the XML-to-GUI generation device 23 causes the operations control unit 26 to display the screen components created in Step S22.

With the operations described above, upon displaying a screen, the MFP 1 (information processing apparatus) of the present embodiment temporarily stores state of a screen so that the same screen can be created when returning to the screen later.

In this way, the MFP 1 temporarily stores the state of the screen before the transition (the screen that has been displayed) and can restore the screen using the stored information upon displaying the screen again. That is, the MFP 1 temporarily stores the state of the screen and therefore can create the same screen when returning to the screen later. Thus it is possible to restore the previous screen even in the case of a screen flow having a change of state between screens.

As described in Step S14, whether the screen needs to be restored, i.e., whether caching needs to be performed, may be specified for each screen in advance in the corresponding screen data to be processed. In this case, it is possible to prevent wastefully performing caching for a screen that does not need to be restored. That is, it is possible to reduce the resource usage by caching states of some screens instead of caching states of all the screens.

Figure 6:
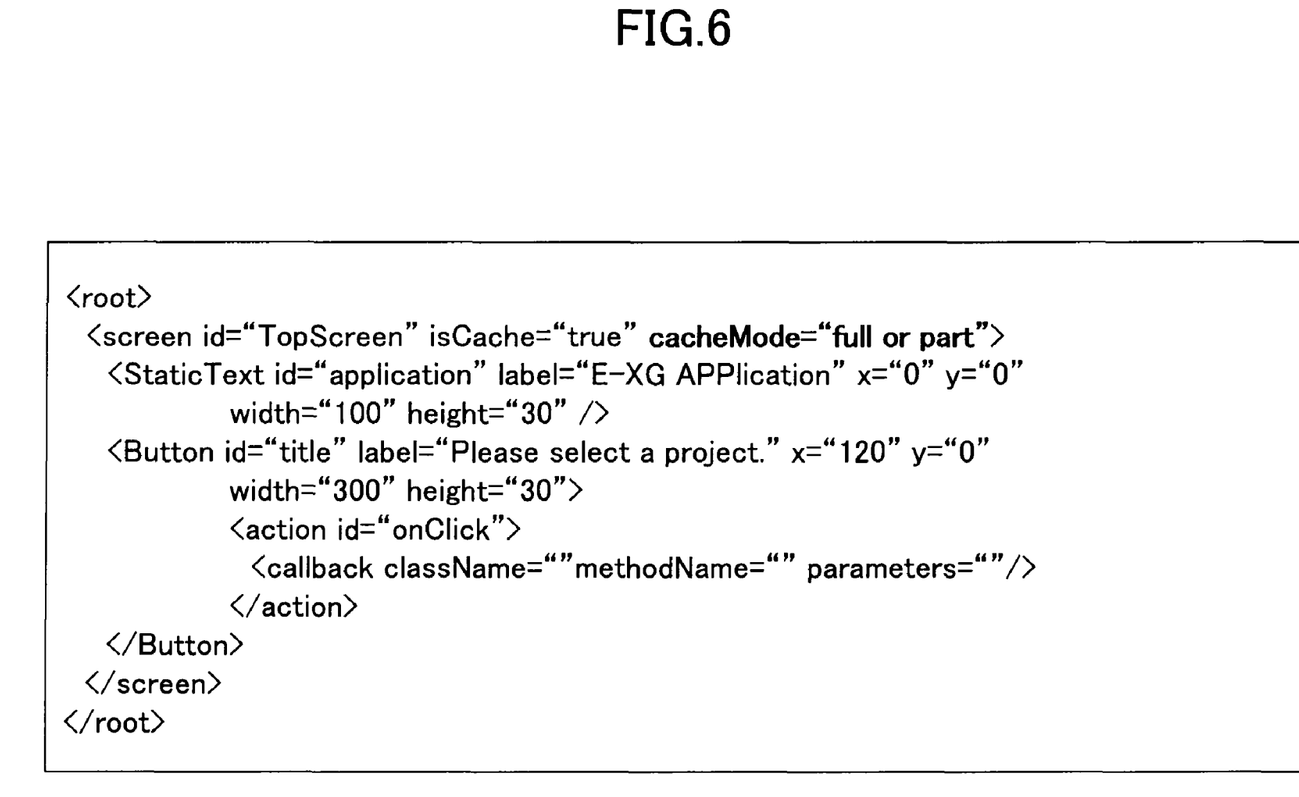
FIG. 6 is a diagram illustrating another example of screen data in an XML format.

FIG. 6 shows another example of screen data in an XML format to be processed in Step S14. In FIG. 6, characters in boldface (cacheMode="full or part") are flag information indicating whether to cache all the screen components created based on the screen data or to cache a part of them, i.e., indicating a setting (storing mode) whether to store all the screen components (full cache) or to store a part of the screen components (partial cache). Such a setting may be contained in advance in the screen data to be processed. With such a setting, it is possible to store, for example, minimum state of the screen displayed before transition (i.e., the screen of which components to be cached) necessary to restore the screen and to restore the screen later based on the stored state, thereby reducing the resource usage. Although caching all the screen components is advantageous in improving the performance, caching a part of the screen components is advantageous in reducing the resource usage. Because caching all the screen components or caching a part of the screen components may be selected for each screen to be cached, caching all the screen components may be selected for a screen that may otherwise take time to be restored in order to increase the processing speed, and caching a part of the screen components may be selected for a less-frequently displayed screen. The storing mode may be selected according to the performance of the application.

Each of the screen components created in Step S14 may have common interfaces such as "getSerializeData" and "setSerializeData". Data acquired by "get" are passed by "set" as they are, so that the previous screen is restored. The screen components that need to be acquired for restoration of the screen may be specified using such common interfaces. In this case, because it is possible to select the screen components necessary for restoration, the resource usage can be reduced compared in the case where all the screen components are cached.

In the case of caching all the screen components, the resources may run out. In view of this, a switching unit may be provided that, if the size of the screen components to be cached exceeds a predetermined size, switches the storing mode of the screens all the screen components of which have been cached to store a part of the screen components thereof. This can reduce the resources required for caching. Upon performing switching, a predetermined number of older screens all the screen components of which have been cached may be selected as screens of which storing mode is to be switched. In this case, because not all the screens all the screen components of which have been cached are switched to the partial cache, the performance upon the switching is improved. In an alternative embodiment, the frequency of display of the screen is calculated for each of the screens all the components of which have been cached, and the storing mode of the screen of the lowest frequency of display may be switched. In this case, it is possible to more quickly display screens having higher frequency of display.

If the screen cache unit 25 does not have space sufficient to store screen components of a screen to be stored, the screen components of the screen may be stored in a hard disk or the like. Thus, it is possible to maintain screen components of all the screens. In other words, it is possible to maintain screen components of all the screens even if the size of the screen components exceeds the size of the screen cache unit 25 available for caching.

Screens that take time to be restored may be retained without being discarded. Screen components of a cached screen may be discarded upon transition to a given screen. Screens whose cached screen components to be discarded upon transition to a given screen may be selected.

While the present invention is described in terms of specific embodiments, it is apparent that variations and modifications may be made without departing from the scope of the invention.

The present application is based on Japanese Priority Application No. 2007-240093 filed on Sep. 14, 2007, with the Japanese Patent Office, the entire contents of which are hereby incorporated herein by reference.

What is claimed is:

1. An information processing apparatus including a display, the apparatus comprising:
   a creating unit configured to create screen components based on screen definition data in which a screen to be displayed on the display is defined;
   a display control unit configured to display the screen formed with the screen components created by the creating unit; and
   a storing unit configured to store, upon transition from the screen displayed by the display controlling unit, at least part of the screen components of the screen displayed before the transition,
   wherein the information processing apparatus includes at least one of a scanner function, a copier function, a facsimile machine function, and a printer function;
   the storing unit stores the at least part of the screen components of the screen based on a predetermined setting indicating whether the at least part of the screen components of the screen displayed before the transition are to be stored;
   the storing unit is configured to store the at least part of the screen components of the screen based on a storing mode, the storing mode being either a first mode in which all of the screen components are stored or a second mode in which only a part of the screen components are stored corresponding to the displayed screen, and the information processing apparatus further includes
   a switching unit configured to switch the storing mode of a screen that has already been stored in the storing unit from the first mode to the second mode, when a size of the screen components to be stored in the storing unit is greater than a predetermined size.

2. The apparatus according to claim 1, wherein the switching unit is configured to preferentially switch an older screen component stored by the storing unit.

3. The apparatus according to claim 1, wherein the switching unit is configured to preferentially switch a screen component corresponding to a screen that is less frequently displayed by the display control unit.

4. The apparatus according to claim 1, wherein the screen definition data includes data in an XML format.

5. An information processing method for use in an information apparatus including a display, the method comprising:
   creating screen components based on screen definition data in which a screen to be displayed on the display is defined;
   displaying the screen formed with the screen components created in the creating step; and
   storing, upon transition from the screen displayed in the displaying step, at least part of the screen components of the screen displayed before the transition,
   wherein the information processing apparatus includes at least one of a scanner function, a copier function, a facsimile machine function, and a printer function;
   the storing step includes storing the at least part of the screen components of the screen based on a predetermined setting indicating whether the at least part of the screen components of the screen displayed before the transition are to be stored;
   the storing step further includes storing, in a memory, the at least part of the screen components of the screen based on a storing mode, the storing mode being either a first mode in which all of the screen components are stored or a second mode in which only a part of the screen components are stored corresponding to the displayed screen, the method further including
   switching the storing mode of a screen that has already been stored in the memory from the first mode to the second mode, when a size of the screen components to be stored in the memory is greater than a predetermined size.

6. The method of claim 5, wherein the switching step comprises preferentially switching an older screen component stored by the memory.

7. The method of claim 5, wherein the switching step comprises preferentially switching a screen component corresponding to a screen that is less frequently displayed by the display.

8. The method of claim 5, wherein the screen definition data includes data in an XML format.

9. A non-transitory computer-readable recording medium storing a program, the program including computer-executable instructions that when executed by a processor cause the processor to execute the steps of:
   creating screen components based on screen definition data in which a screen to be displayed on a display is defined;
   displaying the screen formed with the screen components created in the creating step; and
   storing, upon transition from the screen displayed in the displaying step, at least part of the screen components of the screen displayed before the transition,
   wherein the information processing apparatus includes at least one of a scanner function, a copier function, a facsimile machine function, and a printer function;
   the storing step includes storing the at least part of the screen components of the screen based on a predetermined setting indicating whether the at least part of the screen components of the screen displayed before the transition are to be stored;
   the storing step further includes storing, in a memory, the at least part of the screen components of the screen based on a storing mode, the storing mode being either a first mode in which all of the screen components are stored or a second mode in which only a part of the screen components are stored corresponding to the displayed screen, the method further including
   switching the storing mode of a screen that has already been stored in the memory from the first mode to the second mode, when a size of the screen components to be stored in the memory is greater than a predetermined size.

10. The computer-readable medium of claim 9, wherein the switching step comprises preferentially switching an older screen component stored by the memory.

11. The computer-readable medium of claim 9, wherein the switching step comprises preferentially switching a screen component corresponding to a screen that is less frequently displayed by the display.

12. The computer-readable medium of claim 9, wherein the screen definition data includes data in an XML format.

* * * * *